No. 891,466.  PATENTED JUNE 23, 1908.
H. H. DEWEY.
CORNER STAY FOR CAR BODIES.
APPLICATION FILED OCT. 20, 1905.

Witnesses:
A. L. Lord.
Cassie McElroy.

Inventor,
Henry H. Dewey.
By Fouts & Hull,
Attorneys.

UNITED STATES PATENT OFFICE.

HENRY H. DEWEY, OF CLEVELAND, OHIO.

CORNER-STAY FOR CAR-BODIES.

No. 891,466.  Specification of Letters Patent.  Patented June 23, 1908.

Application filed October 20, 1905. Serial No. 283,612.

*To all whom it may concern:*

Be it known that I, HENRY H. DEWEY, residing at Cleveland, in the county of Cuyahoga and State of Ohio, have invented a certain new and useful Improvement in Corner-Stays for Car-Bodies, of which the following is a full, clear, and exact description, reference being had to the accompanying drawings.

My invention relates to corner stays for car bodies, and has for its object the provision of a stay of this character that is simple, effective in operation, comparatively inexpensive of production, and that is provided with means for permitting free access of air to the ends of the side and end members of the body to which it may be applied, whereby any moisture that may accumulate on such ends may be quickly dried, thereby avoiding decay.

Generally speaking, the invention may be defined as consisting of the combinations of elements, for the purposes specified, embodied in the claims hereto annexed.

Figure 4:
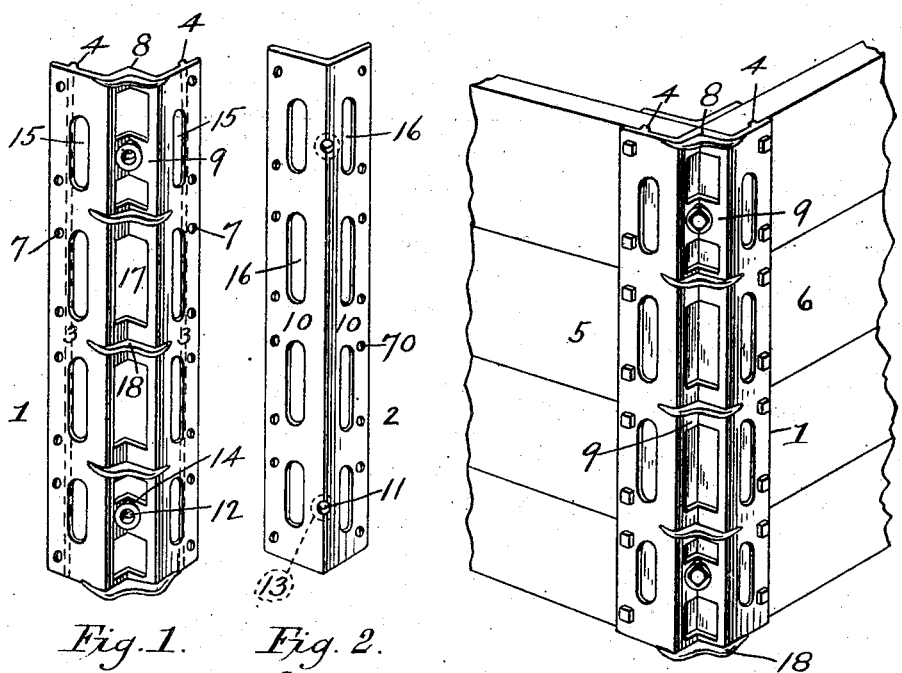
Figure 5:
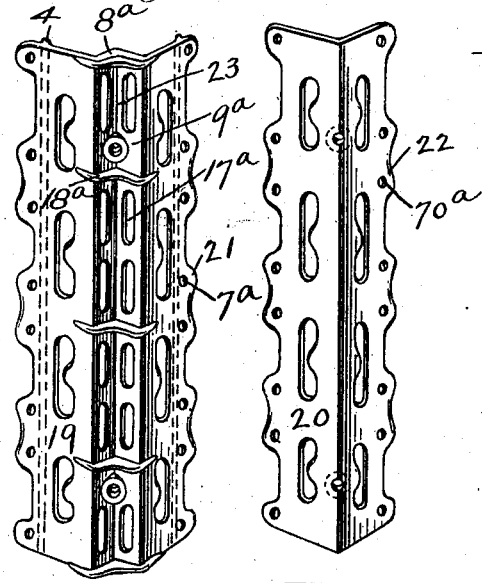

Referring to the drawings:—Figure 1 represents a perspective view of the outer member of my corner stay; Fig. 2 is a similar view of the inner member; Fig. 3 shows the complete stay applied to the side and end members of a car body; and Figs. 4 and 5 represent views, similar to Figs. 1 and 2 respectively, of a modified form of corner stay.

The stay consists preferably of an outer angular member 1 and an inner angular member 2, said members being of a length corresponding to the depth of the side and end members of the car body to which they are to be applied. These members are made of metal, preferably of cast steel, sheet steel, or drop forgings. The outer member comprises two flat side portions or plates 3, the planes of which are at right angles to each other. Each of the plates 3 may be provided with an inwardly projecting longitudinal rib 4 adjacent the outer edge thereof, the rib being adapted to fit into a corresponding rabbet or recess on the outer surface of the adjacent end 5 and side 6 of the body to which it is applied. Adjacent said ribs are the holes 7 for the reception of bolts or nails for securing the member to the car body. The corner or apex of this outer member is bent inwardly to form a reëntrant angular projection 8, the sides 9 of said projection being bent at right angles to the planes of the side plates 3.

The inner member 2 comprises flat side portions or plates 10 which are at right angles to each other. To secure the inner and outer member together, I provide the former with a sufficient number of openings 11 extending through the apex thereof and the latter with a number of corresponding openings 12 at the apex of the reëntrant angular projection. These openings are for the reception of bolts or rivets. In order to provide sufficient thickness of the metal at these points as well as bearing surfaces for the said bolts or rivets, the metal is thickened on the inside of the stay member 2 around the openings 11, as indicated in dotted lines at 13, Fig. 2. Similarly, and for the same purpose, the metal surrounding the openings 12 on the outer side of the projection 8 is also thickened, as shown at 14, Fig. 1. Adjacent their outer edges, the plates 10 are provided with openings 70 corresponding to the openings 7 in the plates 3 and for the same purpose.

The slide plates 3 of the outer member are each provided with a series of elongated openings 15. Similar openings 16, similarly arranged, are provided in the inner member 2. These openings not only lessen the weight of the stay, reducing the cost of production, but provide for the admission of air in contact with the side and end members of the car body at a plurality of points, drying up any moisture that may find its way between the plates 3 and 10 and the adjacent portions of the car body.

As will be apparent from an inspection of Fig. 3, the sides 9 of the projection 8 form abutting surfaces for the ends of the side and end members 5 and 6 of the car body. Any moisture that may work its way between the sides 9 and the ends of the planking of the car body is particularly apt to produce injurious results, as the moisture is admitted against the ends of the planking, which fact owing to the direction of the grain in said planking, will cause speedy decay of the ends thereof. To avoid this, as well as to further lighten the weight of the stay, I provide openings 17 within the projection 8, said openings preferably extending continuously from one side of such projection across the apex to the other side. Between such openings, transverse ribs 18 are placed, thereby compensating for the weakening of the stay by the provision of the openings 17 and permitting the employment of a sufficient number of openings of sufficient size to secure proper ventilation and a speedy drying of the ends of the planks.

In Figs. 4 and 5, I have shown a modification of the corner stay shown in the preceding figures. The stay members 19 and 20 are preferably of malleable iron. Instead of forming the openings 7ª and 70ª in the body of the members 19 and 20, I may, in order to further lighten the stay, provide these openings in ears 21 and 22 projecting respectively from the sides of the outer and inner members. Furthermore, the openings 17ª in the sides of the reëntrant angular projection 8ª may be provided in each side 9ª of said projection, leaving a web 23 between the openings, as shown in Fig. 4. As in the case of the preceding modification, transverse strengthening ribs 18ª will be provided for the projection 8ª. These ribs are provided, not only intermediate of the ends of such projection, but at the ends themselves.

From the foregoing description, it will be apparent that I have produced a metal corner stay which is light, cheap of construction, which will rigidly secure in proper position and protect the corners of the car bodies, and which will at the same time prevent the decay of the planking of such bodies by the admission of air thereto to quickly dry any moisture that may be admitted between the stay members and the adjacent ends of the planking.

While I have necessarily shown my invention in detail, it will be apparent that such details may be departed from more or less without avoiding the spirit of my invention. I therefore do not propose to be limited to such details except as they may be positively included in the claims hereto annexed or may be rendered necessary by the prior state of the art.

Having thus described my invention what I claim as new and desire to secure by Letters Patent is:

1. A corner stay for car bodies comprising an inner angular member and an outer angular member, said members adapted to embrace the end portions of the end and side of a car body and extending substantially the full height thereof, ventilating openings being provided in said stay for such side and end of the body, substantially as specified.

2. A corner stay for car bodies comprising an inner angular member and an outer angular member adapted to be applied to the end portions of the side and end of a car body, one of said members being provided with a rib or ribs and with one or more openings adjacent said rib or ribs, and means for connecting said members together, substantially as specified.

3. A corner stay for car bodies adapted to embrace the end portions of the adjacent side and end of a car body and extending substantially the full height thereof, said stay having therein ventilating openings for such side and end, substantially as specified.

4. A corner stay for car bodies, said stay being adapted to embrace the end portions of the side and end of a car body and being provided with ventilating openings therein opposite the ends of the planking of such side and end, substantially as specified.

5. A corner stay for cars adapted to embrace the end portions of the side and end of a car body and provided with a reëntrant angular projection against which the ends of the said side and end abut, said projection having ventilating openings therethrough, substantially as specified.

6. A corner stay for car bodies comprising an inner and an outer angular member, the outer member having a reëntrant angular projection adapted to abut against the apex of the inner member, the sides of said reëntrant angular projection furnishing abutments for the ends of the side and end of the car body and having a ventilating opening or openings therein, substantially as specified.

7. A corner stay for car bodies comprising an inner angular member and an outer angular member adapted to be applied to the end portions of the side and end of a car body and extending substantially the full height thereof, each of said members having a series of openings for the reception of fastening means and one or more ventilating openings, substantially as specified.

8. A corner stay for car bodies, said stay comprising an inner and an outer angular member adapted to embrace the adjacent end portions of the side and end of a car body, abutments projecting from one of said members toward the other and adapted to engage such end portions, said abutments being provided with ventilating openings therethrough, substantially as specified.

9. A corner stay for car bodies, said stay comprising a reëntrant angular projection the sides of which form abutments for the end portions of the side and end of the car body, said projection being provided with transverse ribs and with ventilating openings between said ribs, substantially as specified.

10. A corner stay for car bodies, said stay comprising an inner and an outer angular member adapted to receive between them the adjacent end portions of the side and end of a car body, abutments extending between said members spacing the same apart and adapted to engage such end portions, and ribs extending transversely of said abutments, there being openings through said abutments between said ribs, substantially as specified.

11. A corner stay for car bodies comprising inner and outer angular members adapted to embrace the adjacent end portions of the side and end of a car body, the outer member having a reëntrant angular projection the sides of which space said members and serve as abutments for the said end portions, and means for securing said members together, ventilating openings being provided in the sides of the said projection and in the sides of the members, substantially as specified.

12. A corner stay for car bodies comprising an inner and an outer angular member adapted to embrace the adjacent end portions of the side and end of a car body, the outer member having a reëntrant angular projection the sides of which space said members apart and serve as abutments for the side and end of such car body, ribs extending transversely of said projection, said projection having openings between said ribs, and fastening means, as bolts, extending through the apex of the inner member and the apex of the said projection, substantially as specified.

13. A corner stay for car bodies comprising an inner angular metallic member and an outer angular metallic member adapted to be applied to the end portions of the end and side of a car body, the outer member having a reëntrant angular projection extending to the apex of the inner member, and means for securing the central portions of said members together.

14. A corner stay for car bodies comprising an inner angular member and an outer angular member having a reëntrant angular projection, strengthening ribs extending across the reëntrant angular recess, and means for securing said members together.

In testimony whereof I affix my signature in the presence of two witnesses.

HENRY H. DEWEY.

Witnesses:
  G. G. SCHONEBERGE,
  J. B. HULL.